United States Patent
Reinhart

(10) Patent No.: US 10,988,196 B2
(45) Date of Patent: Apr. 27, 2021

(54) ROTATABLE CONNECTING ASSEMBLY FOR A TOP CASE

(71) Applicant: Bayerische Motoren Werke Aktiengesellschaft, Munich (DE)

(72) Inventor: Peter Reinhart, Peissenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/223,876

(22) Filed: Dec. 18, 2018

(65) Prior Publication Data
US 2019/0118890 A1  Apr. 25, 2019

Related U.S. Application Data

(63) Continuation of application No. PCT/EP2017/071836, filed on Aug. 31, 2017.

(30) Foreign Application Priority Data

Oct. 18, 2016  (DE) .................... 10 2016 220 296.0

(51) Int. Cl.
| | | |
|---|---|---|
| *B62J 7/04* | (2006.01) | |
| *B62J 7/08* | (2006.01) | |
| *B62J 9/00* | (2020.01) | |
| *B62J 9/20* | (2020.01) | |

(52) U.S. Cl.
CPC . *B62J 7/04* (2013.01); *B62J 7/08* (2013.01); *B62J 9/00* (2013.01); *B62J 9/20* (2020.02)

(58) Field of Classification Search
CPC ....... B62J 7/04; B62J 7/08; B62J 9/001; B62J 9/00; B62J 9/20; E05D 3/18; B60N 2/14; B60R 9/00; B60R 9/045

USPC ....... 224/282, 553, 412, 419, 427–428, 431, 224/443, 502

See application file for complete search history.

(56) References Cited

U.S. PATENT DOCUMENTS

| | | | | |
|---|---|---|---|---|
| 4,085,961 A | * | 4/1978 | Brown | B60R 11/06 108/139 |
| 5,040,710 A | * | 8/1991 | Lee | B62J 7/00 224/282 |

(Continued)

FOREIGN PATENT DOCUMENTS

| | | |
|---|---|---|
| CN | 102390466 A | 3/2012 |
| DE | 950 350 C | 10/1956 |

(Continued)

OTHER PUBLICATIONS

Machine translation of DE102014223048; http://translationportal.epo.org/emtp/translate/?ACTION=description-retrieval&COUNTRY=DE&ENGINE=google&FORMAT=docdb&KIND=A1&LOCALE=en_EP&NUMBER=102014223048&OPS=ops. (Year: 2016).*

(Continued)

*Primary Examiner* — Adam J Waggenspack
(74) *Attorney, Agent, or Firm* — Crowell & Moring LLP

(57) ABSTRACT

A connecting assembly for fastening a top case to a motor vehicle, in particular a motorcycle or a motorcycle-like vehicle, includes a first connecting section, which is designed for connection to the motor vehicle, and a second connecting section which is designed for connecting to an underside of the top case. The first and the second connecting sections are connected to each other for rotation about a defined axis of rotation.

11 Claims, 2 Drawing Sheets

(56) References Cited

U.S. PATENT DOCUMENTS

| | | | | |
|---|---|---|---|---|
| 6,007,128 | A | * | 12/1999 | Hines, Jr. .................. B60R 9/00 224/282 |
| 7,311,232 | B2 | * | 12/2007 | Watanabe .................. B62J 7/08 224/413 |
| 7,472,958 | B2 | * | 1/2009 | Sano ...................... B60N 2/146 297/344.21 |
| 8,177,312 | B2 | * | 5/2012 | Nagami .............. B60R 11/0235 312/246 |
| 2009/0015731 | A1 | | 1/2009 | Nagami |
| 2010/0052392 | A1 | * | 3/2010 | Lung ........................ B60N 2/06 297/344.24 |

FOREIGN PATENT DOCUMENTS

| | | |
|---|---|---|
| DE | 20 2010 009 226 U1 | 12/2011 |
| DE | 10 2013 223 317 A1 | 5/2015 |
| DE | 10 2014 223 048 A1 | 5/2016 |
| EP | 1 785 343 A1 | 5/2007 |
| JP | 2014-213733 A | 11/2014 |

OTHER PUBLICATIONS

International Search Report (PCT/ISA/210) issued in PCT Application No. PCT/EP2017/071836 dated Nov. 8, 2017 with English translation (six pages).

German-language Written Opinion (PCT/ISA/237) issued in PCT Application No. PCT/EP2017/071836 dated Nov. 8, 2017 (five pages).

German-language Search Report issued in counterpart German Application No. 10 2016 220 296.0 dated Aug. 24, 2017 with partial English translation (14 pages).

Chinese-language Office Action issued in counterpart Chinese Application No. 201780039707.5 dated Nov. 27, 2019 with English translation (12 pages).

Chinese-language Office Action issued in Chinese Application No. 201780039707.5 dated May 11, 2020 with English translation (12 pages).

Chinese-language Office Action issued in Chinese Application No. 201780039707.5 dated Oct. 20, 2020 with English translation (13 pages).

* cited by examiner

ROTATABLE CONNECTING ASSEMBLY FOR A TOP CASE

CROSS REFERENCE TO RELATED APPLICATIONS

This application is a continuation of PCT International Application No. PCT/EP2017/071836, filed Aug. 31, 2017, which claims priority under 35 U.S.C. § 119 from German Patent Application No. 10 2016 220 296.0, filed Oct. 18, 2016, the entire disclosures of which are herein expressly incorporated by reference.

BACKGROUND AND SUMMARY OF THE INVENTION

The invention relates to a connecting assembly for fastening a top case to a motor vehicle, in particular to a motorcycle or to a motorcycle-like vehicle, and to a correspondingly equipped motor vehicle, in particular a motorcycle or a motorcycle-like vehicle.

What are known as "top cases" are known from the prior art and are suitcase-like luggage items which are usually placed in the rear region of a motorcycle onto a luggage rack which is connected fixedly to a vehicle frame, and are fastened to said luggage rack. Comparable assemblies can also be used, inter alia, for motorcycle-like vehicles, such as motor scooters or scooters, in particular two-wheeled, three-wheeled or four-wheeled scooters, and for quads or trikes.

It has been shown that top cases, in particular in a state in which they are loaded with luggage, can encourage or boost a tendency of the motorcycle to wobble. Great efforts are usually made on the vehicle side to reduce a tendency to wobble of this type, for example by way of complicated adaptations of the chassis or by way of complicated luggage rack systems. In order to reduce the tendency to wobble, said luggage rack systems comprise, for example, a connecting plate which is mounted in a "floating" manner on the substructure of the luggage rack and on which the top case can be arranged as required.

A decoupling of movement is achieved with the aid of the floating mount, which decoupling reduces a transmission of load changes which act on the vehicle to the top case. To this end, the connecting plate is usually configured so as to be movable relative to the substructure of the luggage rack in the lateral direction of the vehicle, with the result that the entire top case can be moved in said direction.

It has been shown, however, that the lateral movability of the connecting plate with respect to the overall vehicle, which lateral movability is caused by way of the floating mount, presents a structural challenge, in particular with regard to a harmonization between the intended vibration-damping effect and a sufficient strength for a stable and durable connection. Since the top case is usually positioned directly behind a pillion passenger, there is the possibility, moreover, that the pillion passenger blocks or at least reduces the lateral movability by way of body contact with the top case, or else the lateral movement of the top case becomes discernible to the pillion passenger in an unpleasant way.

It is therefore an object of the invention to provide a vehicle with a top case which at least reduces the stated disadvantages.

Accordingly, a connecting assembly for fastening a top case to a motor vehicle, in particular a motorcycle or a motorcycle-like vehicle, is provided, having:

a first connecting section which is configured for connecting to the motor vehicle, and a second connecting section which is configured for connecting to an underside of the top case.

Moreover, the first and the second connecting section are connected to one another such that they can be moved rotationally about a defined rotational axis.

The connecting assembly is therefore arranged between the top case and the motor vehicle and therefore establishes the connection between the two. The connection of the first connecting section to the motor vehicle and/or the connection of the second connecting section to the top case can be configured independently of one another, for example in each case as a positively locking, non-positive and/or integrally joined connection.

The rotationally movable connection of the first connecting section to the second connecting section makes a rotational movement of the second connecting section possible relative to the first connecting section and therefore (in the installed state) relative to the entire motor vehicle.

An extent of movement can comprise, for example, a rotation by a maximum angle between +10° and −10°, preferably between +5° and −5°. This means that the second connecting section which can be connected to the top case can be rotated out of a neutral position at most by an angle of up to +10° or by up to −10° (preferably at most +5° and −5°).

For example, the connecting assembly can comprise a rotary joint for providing the rotationally movable connection. Here, the rotary joint defines the rotational axis and is connected firstly to the first connecting section and secondly to the second connecting section.

In accordance with one embodiment, the rotary joint is arranged eccentrically with respect to a geometric center of the connecting assembly. The geometric center is to be understood to mean the geometric centroid of the connecting assembly, which centroid can differ from a center of mass of the connecting assembly. The eccentric arrangement affords the possibility that a section of the connecting assembly which is further away from the rotational axis has a greater extent of movement in the case of a rotation about the rotational axis than a section which is at a smaller distance from the rotational axis. If said section at a smaller distance and therefore with a smaller extent of movement is therefore arranged adjacent to the pillion passenger, a possibly disruptive influence of the pillion passenger can thus be reduced correspondingly and a tendency to wobble of the vehicle can nevertheless be reduced considerably.

Furthermore, the connecting assembly can comprise at least one guide projection which is guided in each case in or on a guide section for guiding a rotational movement. With the aid of the one or plurality of guide projections, the rotational movability of the two connecting sections with respect to one another can therefore be guided and stabilized, with the result that the strength of the connecting assembly is improved, in particular in an installed state with a loaded top case. For example, the respective assigned guide section can be configured as a groove or as a slot (which is curved in an arcuate manner).

The at least one guide projection can thus be connected fixedly to the first connecting section and the respective associated guide section can be assigned to the second connecting section. As an alternative, the at least one guide projection can be connected fixedly to the second connecting section and the respective associated guide section can be assigned to the first connecting section.

Furthermore, the connecting assembly can comprise at least one stop for limiting an extent of the rotational movement, in particular a stop which is configured as an elastic damper element. Optionally, the stop can additionally be of adjustable configuration. For example, a rubber material or elastically deformable plastic is suitable as a material for the elastic damper element.

In every case, the stop affords the possibility of exactly defining the extent of the rotational movement and therefore of adapting a vibration-reducing action of the overall connecting assembly.

Furthermore, a motor vehicle is provided, in particular a motorcycle or motorcycle-like vehicle, with a top case, the top case being connected to the motor vehicle by way of a connecting assembly, and the connecting assembly being configured in accordance with this description.

A motorcycle-like vehicle is to be understood to mean, in particular, all single track vehicles, but also multiple track vehicles in each case with a corresponding, saddle-shaped seat bench for the user, particularly preferably two-wheeled, three-wheeled or four-wheeled motor scooters or scooters, trikes and quads.

In the state in which it is installed on the vehicle, the connecting assembly can be configured or arranged so as to extend in a plane parallel to an underside of the top case. In this way, a movability of the top case in a plane parallel to the underlying surface of the vehicle is ensured.

The rotational axis is preferably oriented in a vehicle vertical direction, with the result that the rotational axis lies perpendicularly with respect to the top case underside.

The rotational axis is likewise preferably arranged centrally with respect to the top case in a vehicle width direction. This means that the rotational axis is arranged behind the pillion passenger in the vehicle longitudinal direction, with the result that an awareness of or else an obstacle to the rotational movement by way of the pillion passenger is minimized.

In accordance with a further embodiment, the rotational axis is arranged in the vehicle longitudinal direction between a front side of the top case, which front side points in the driving direction, and a center of mass of the top case.

This means that the rotational axis is arranged eccentrically with respect to the top case (with regard to the vehicle longitudinal direction), with the result that the same effect is produced which has already been described in respect of the eccentric arrangement in relation to the entire connecting assembly. In other words, the eccentric arrangement in the installed state has the effect that that front side of the top case which faces the pillion passenger has a smaller extent of movement within the context of a rotational movement than a rear side which lies opposite the front side. In this way, the awareness of or else the obstacle to the rotational movement by way of the pillion passenger is additionally minimized, and at the same time as high a vibration-damping action as possible is ensured and the tendency to wobble of the vehicle is reduced.

For example, a spacing of the rotational axis from the front side of the top case can correspond to less than half, preferably less than one third of an overall length of the top case which is oriented in the vehicle longitudinal direction. In other words, the rotational axis is therefore arranged in the front half, preferably in the front third of the overall length of the top case which extends in the vehicle longitudinal direction, in order to achieve an eccentric arrangement which is as optimum as possible.

In both cases, the pivot point which is achieved lies in a front region of the top case with regard to the vehicle longitudinal direction, in order that the top case can rotate via its center of mass and can therefore move in the vehicle width direction, in order to provide the vibration-damping action and therefore to reduce the tendency to wobble of the entire vehicle.

On account of the fixed connecting point or bearing point which is provided by way of the defined rotational axis between the top case and the motor vehicle, fastening which is as free from play as possible can be produced in a structurally simple way, and an effect on the pillion passenger on account of the movement of the top case is also reduced.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
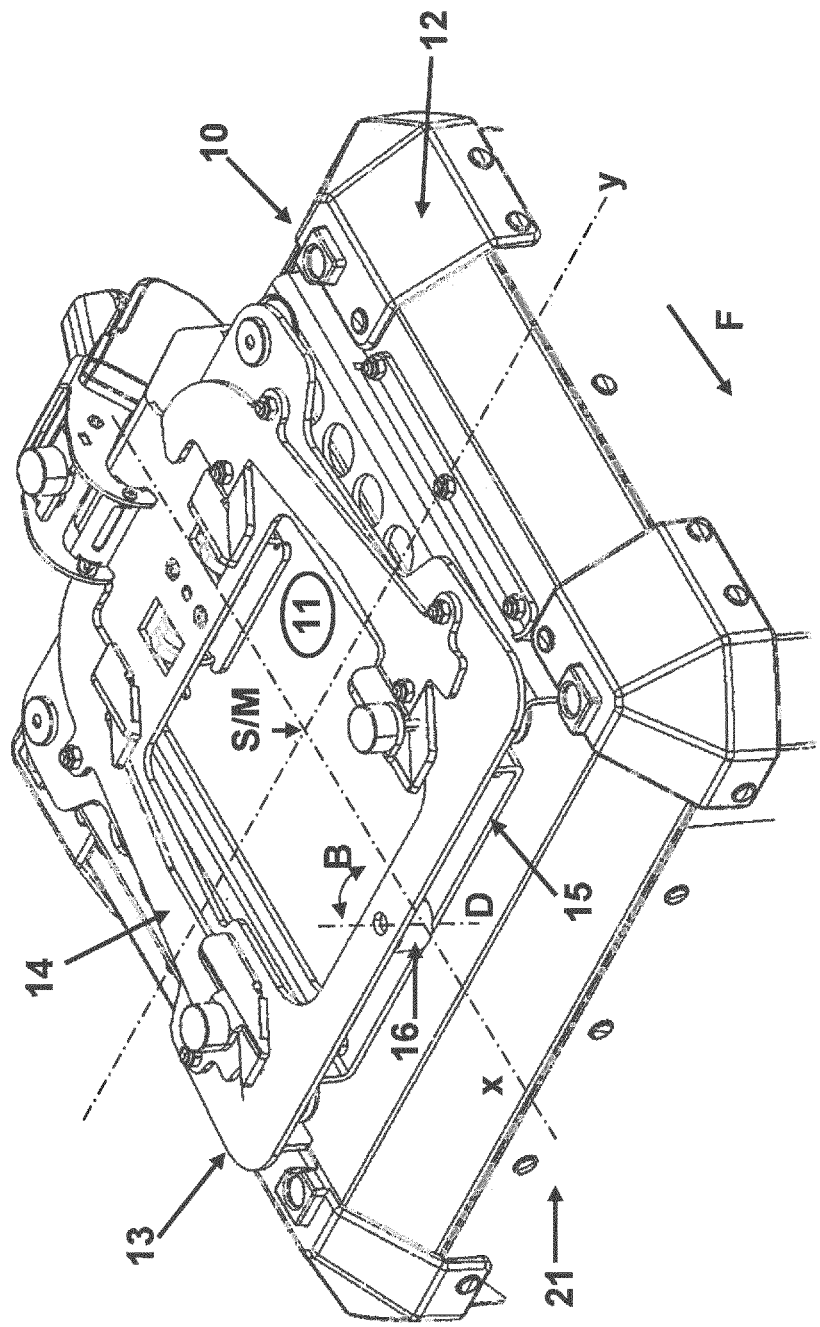
FIG. 1 shows a perspective view of an underside of a top case in accordance with and embodiment of the present invention.

FIG. 1 shows a perspective view of an underside 11 of a top case 10 for a motor vehicle (not shown), such as a motorcycle or a motorcycle-like vehicle. The top case 10 comprises a solid body 12 for receiving luggage, and a connecting assembly 13. Said connecting assembly 13 is arranged on an outer wall of the solid body 12, which outer wall defines the underside 11, and is provided for fastening the top case 10 to the vehicle. To this end, the connecting assembly 13 comprises a first connecting section 14 which can be connected to the motor vehicle, and a second connecting section 15 which is connected to the underside 11 of the top case 10. The first 14 and the second connecting section 15 are connected to one another such that they can be moved rotationally about a defined rotational axis D. To this end, the connecting assembly 13 comprises a rotary joint 16 for providing the rotationally movable connection (rotational movement B).

Figure 2:
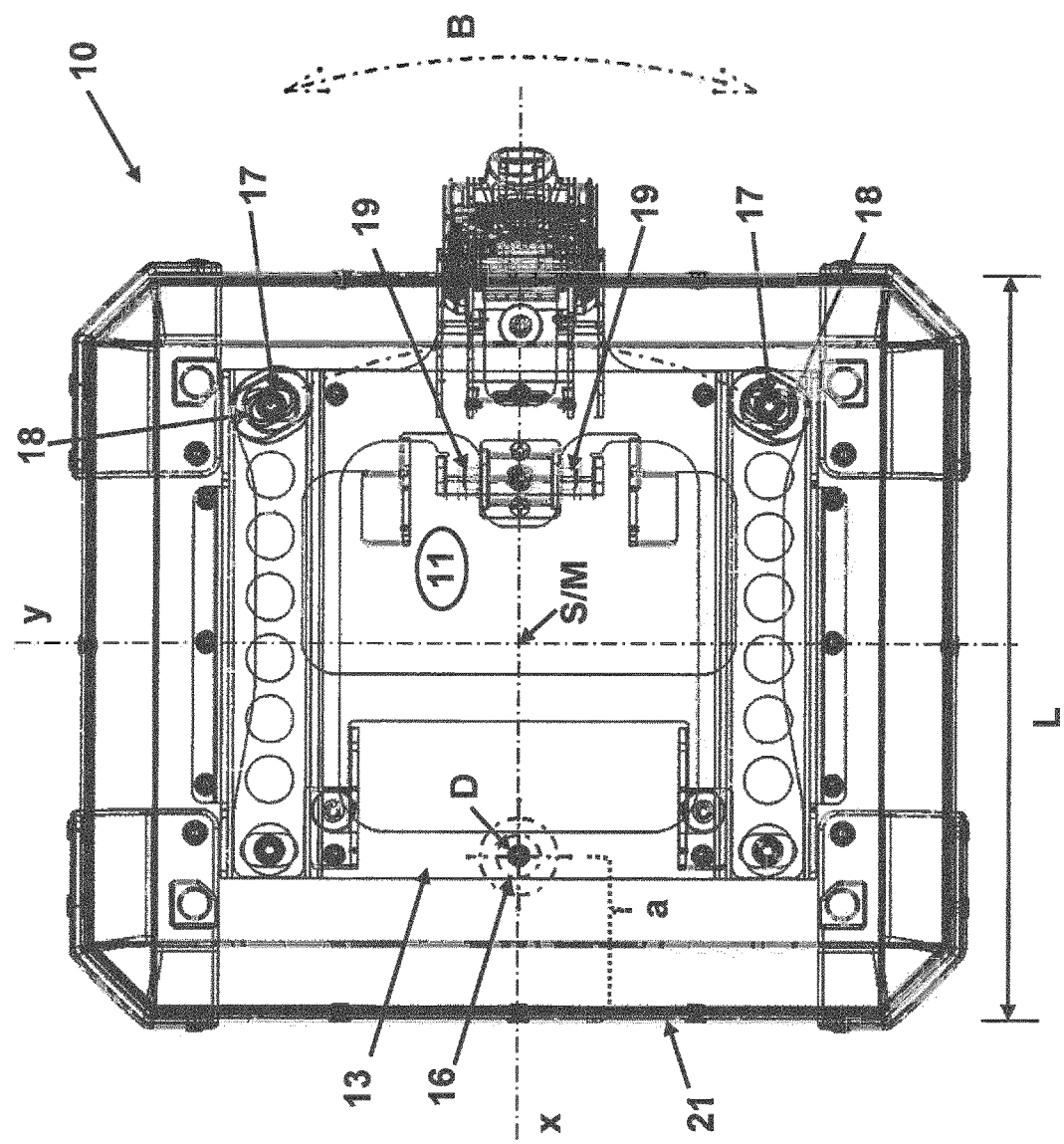
FIG. 2 shows a plan view which is directed toward the underside of the top case from FIG. 1.

As shown in FIG. 1, the connecting assembly 13 extends in a plane parallel to the underside 11, that is to say to the bottom of the top case 10. Here, the rotational axis D is oriented perpendicularly with respect to the underside 11 (and therefore in a vehicle vertical direction in the installed state on the vehicle). In accordance with FIG. 2, the rotational axis D is arranged centrally with respect to the top case 10 in a vehicle width direction y. Moreover, the rotational axis D is arranged with regard to a vehicle longitudinal direction x between a front side 21 of the top case 10, which front side 21 points in the driving direction F, and a center of mass M of the top case 10.

As shown in FIG. 1 and in the plan view which is directed toward the underside 11 of the top case 10, the rotary joint 16 is arranged eccentrically with respect to a geometric center S or with respect to a geometric centroid S of the connecting assembly 13. A spacing a of the rotational axis D from the front side 21 of the top case 10 preferably corresponds to less than half, preferably less than a third of an overall length L of the top case 10 which is oriented in the vehicle longitudinal direction x. Here, the geometric centroid S does not necessarily have to coincide with the center of mass M of the top case 10 (in the plan view of FIG. 2) or a center of mass (not shown) of the connecting assembly 13.

Furthermore, the connecting assembly 13 comprises two guide projections 17 which are guided in each case in a guide section 18 for guiding the rotational movement B. Said objects 17, 18 are arranged spaced apart from the rotational axis D at remote ends of the connecting assembly 13, in order to keep a spacing from the rotational axis D as great as possible, and therefore to achieve an optimum and stable guide effect and damping effect and to reduce the tendency to wobble.

As shown, the two guide projections 17 are connected fixedly to the second connecting section 15, and the two guide sections 18 are assigned to the first connecting section 14. As an alternative and therefore not shown here, the two guide projections 17 can also, however, be connected to the first connecting section 14, and the guide sections 18 can be assigned to the second connecting section 15.

Furthermore, the connecting assembly 13 has two stops 19 for limiting an extent of movement of the rotational movement B, which stops 19 can be configured, for example, in each case as an elastic damper element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting assembly for fastening a top case to a motor vehicle, comprising:
    a first connecting section configured for connecting the connecting assembly to the motor vehicle;
    a second connecting section configured for connecting the connecting assembly to an underside of the top case;
    at least one guide projection; and
    at least one guide section,
    wherein
    the first and second connecting sections are connected to one another such that the first and second connecting sections remain with the top case when the top case is not fastened on the motor vehicle,
    the first and the second connecting sections are connected to one another by a rotationally moveable connection having a rotational axis in a plane containing a central longitudinal axis of the motor vehicle such that one of the first and second connecting sections is rotatable relative to the other connecting section about the rotational axis without changing a separation distance between the first and second connecting sections,
    either
        the at least one guide projection is fixed to the first connecting section and the guide section is at the second connecting section, or
        the at least one guide projection is fixed to the second connecting section and the guide section is at the first connecting section,
    the at least one guide projection is guided in or on the at least one guide section to guide rotary movement of the first and the second connecting sections relative to one another about the rotationally movable connection,
    the rotatably movable connection is arranged in a region of the connecting assembly away from a region of the connecting assembly at which the at least one guide projection and the at least one guide section are located,
    the at least one guide projection and the at least one guide section
        are located in a plane that intersects the rotational axis of the rotationally movable connection,
        when in an installed position are located in a region of the connecting assembly that is to the rear of the rotationally movable connection relative to a forward travel direction of the motor vehicle, and
        are movable relative to one another parallel to the plane that intersects the rotational axis of the rotationally movable connection, and the connecting assembly includes at least one stop configured to limit an extent of the rotational movement of the first and the second connecting sections relative to one another within a range of motion between +10 degrees and −10 degrees.

2. The connecting assembly as claimed in claim 1, wherein
    the rotationally movable connection is a rotary joint.

3. The connecting assembly as claimed in claim 2, wherein
    the rotary joint is arranged eccentrically with respect to a geometric centroid of the connecting assembly.

4. The connecting assembly as claimed in claim 1, wherein
    the at least one stop is an elastic damper.

5. A motor vehicle, comprising:
    a top case;
    a first connecting section configured for connecting a connecting assembly to the motor vehicle; and
    a second connecting section configured for connecting the connecting assembly to an underside of the top case,
    at least one guide projection; and
    at least one guide section,
    wherein
    the first and second connecting sections are connected to one another such that the first and second connecting sections remain with the top case when the top case is not fastened on the motor vehicle,
    the first and the second connecting sections are connected to one another by a rotationally moveable connection having a rotational axis in a plane containing a central longitudinal axis of the motor vehicle such that one of the first and second connecting sections is rotatable relative to the other connecting section about the rotational axis,
    either
    the at least one guide projection is fixed to the first connecting section and the guide section at the second connecting section, or
    the at least one guide projection is fixed to the second connecting section and the guide section is at the first connecting section,
    the at least one guide projection is guided in or on the at least one guide section to guide rotary movement of the first and the second connecting sections relative to one another about the rotation axis without changing a separation distance between the first and second connecting sections,
    the rotation axis is arranged in a region of the connecting assembly away from a region of the connecting assembly at which the at least one guide projection and the at least one guide section are located,
    the at least one guide projection and the at least one guide section
    are located in a plane that intersects the rotational axis of the rotationally movable connection, when in an installed position are located in a region of the connecting assembly that is to the rear of the rotationally movable connection relative to a forward travel direction of the motor vehicle, and are movable relative to one another parallel to the plane that intersects the rotational axis of the rotationally movable connection, and the connecting assembly includes at least one stop configured to limit an extent of the rotational movement of the first and the second connecting sections relative to one another within a range of motion between +10 degrees and −10 degrees.

6. The motor vehicle as claimed in claim 5, wherein the connecting assembly is fixed to the top case in a plane parallel to the underside of the top case.

7. The motor vehicle as claimed in 6, wherein the rotational axis is perpendicular to the underside of the top case.

8. The motor vehicle as claimed in claim 7, wherein the rotational axis is centered on the top case in a width direction transverse to a travel direction of the motor vehicle.

9. The motor vehicle as claimed in claim 8, wherein the rotational axis is located in a longitudinal direction parallel to the travel direction of the motor vehicle between a front side of the top case facing in the travel direction and a center of mass of the top case.

10. The motor vehicle as claimed in claim 9, wherein a spacing of the rotational axis from the front side of the top case is less than half of an overall length of the top case in the travel direction.

11. The motor vehicle as claimed in claim 10, wherein the spacing is less than one third of an overall length of the top case.

* * * * *